Feb. 10, 1970         H. H. SMITH         3,495,159
TEMPERATURE COMPENSATION CIRCUIT FOR IMPEDANCE BRIDGES
Filed June 5, 1967
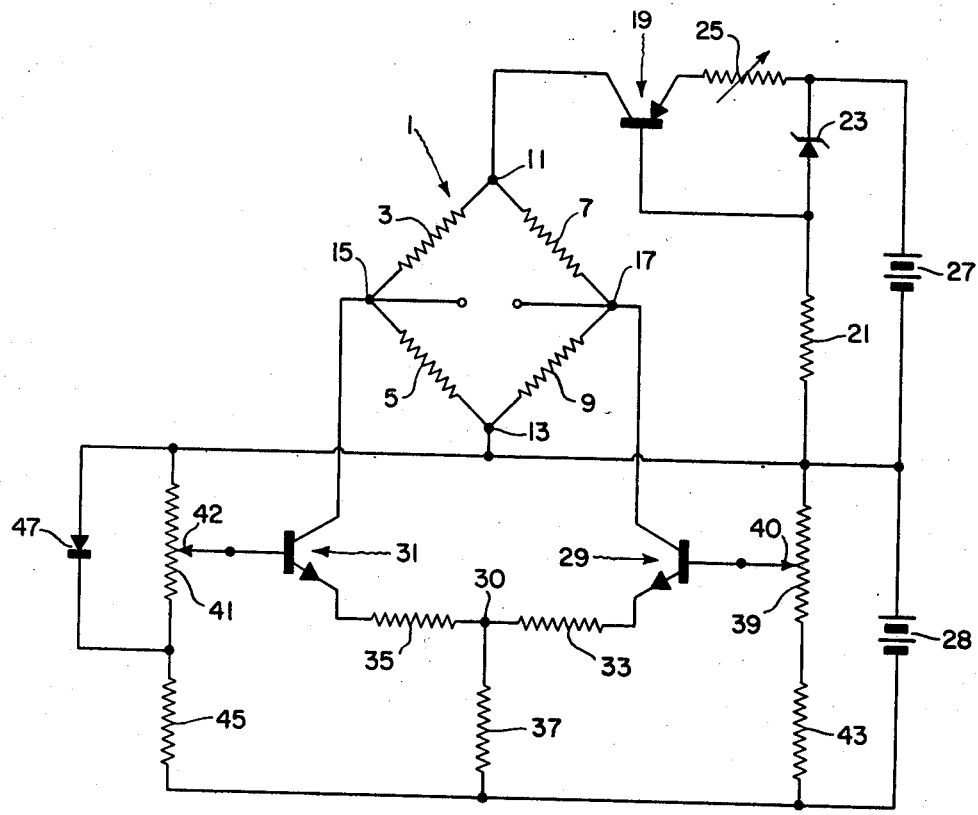
INVENTOR.
HOWARD H. SMITH
BY *Lockwood W. Burton*
ATTORNEY.

United States Patent Office 3,495,159
Patented Feb. 10, 1970

3,495,159
TEMPERATURE COMPENSATION CIRCUIT FOR IMPEDANCE BRIDGES
Howard H. Smith, Menlo Park, Calif., assignor to Honeywell Inc., Minneapolis, Minn., a corporation of Delaware
Filed June 5, 1967, Ser. No. 643,440
Int. Cl. G01r 17/02
U.S. Cl. 323—69                                          7 Claims

ABSTRACT OF THE DISCLOSURE

A temperature compensation circuit for neutralizing the adverse effects of ambient temperature variations upon the null point of an impedance bridge is provided by use of the impedance-temperature characteristic of a diode to control compensation currents injected into adjacent arms of the impedance bridge. The diode is physically positioned to be subject to the same ambient temperature variations as those influencing the impedance bridge, and the compensation currents are provided by means of a differential amplifier.

---

A chronic problem intrinsic with the use of an impedance bridge as a measuring means is the adverse effect of ambient temperature variations upon the null point of the bridge. Initially balanced impedance bridges become unbalanced because their individual bridge elements inherently change values of impedance unpredictably and nonuniformly as a result of ambient temperature changes. This problem is critical in applications using highly sensitive impedance bridges to measure physical conditions of small magnitudes, e.g. a semiconductor strain gauge being used to measure fluid pressure.

It is, accordingly, an object of the present invention to provide a temperature compensation circuit for neutralizing the adverse effects of ambient temperature variations upon the null point of an impedance bridge.

More specifically, it is an object of the present invention to provide a compensation circuit as set forth characterized by use of means responsive to ambient temperature variations to control currents injected into adjacent bridge arms to compensate an impedance bridge for adverse temperature effects.

In accomplishing these and other objects, there has been provided in accordance with the present invention a temperature compensation circuit comprising a constant current source, a first and a second current path, means for dividing the constant current between the first and second current paths, and means responsive to temperature variations for controlling the proportional division of the constant current between the first and second current paths in accordance with temperature variations. The means responsive to temperature variations is physically positioned in close proximity to an impedance bridge for exposure to the identical ambient temperature variations as the bridge elements. The first current path is connected in series with one of the bridge arms and the second current path is connected in series with an adjacent bridge arm. The means responsive to the temperature variations then, by controlling the proportional division of the constant current between the first and second current paths, controls the current injected into adjacent bridge arms and thereby causes the impedance bridge to be compensated for adverse temperature effects.

A better understanding of the invention may be had from the following detailed description when read in connection with the accompanying drawing in which the single figure is a schematic diagram of a temperature compensation circuit according to the present invention.

Referring now to the drawing in more detail, there is shown an impedance bridge 1 having impedance elements 3, 5, 7 and 9, which are subject to being adversely affected by temperature variations, input terminals 11 and 13 and output terminals 15 and 17. Connected across the bridge input terminals 11 and 13 is a first constant current source means comprised of a transistor 19, a resistor 21, a zener diode 23, a variable resistor 25 and a battery 27. The collector electrode of the transistor 19 is connected to the bridge input terminal 11 and the emitter electrode is connected through the variable resistor 25 to the positive terminal of the battery 27. One terminal of the zener diode 23 is also connected to the positive terminal of the battery 27; the second terminal of the zener diode 23 is connected to the base electrode of the transistor 19. The resistor 21 is connected from the base electrode of the transistor 19 to the negative terminal of the battery 27. The negative terminal of the battery 27, in turn, is connected to the bridge input terminal 13.

In this first constant current source means, the zener diode 23 fixes a constant D.C. bias on the base electrode of the transistor 19. A constant current is thus supplied through the variable resistor 25 and the emitter-collector path of the transistor 19 to the input terminal 11. The magnitude of this current can be determined by adjustment of the variable resistor 25.

The temperature compensation circuit, as shown in a preferred embodiment of the present invention, in the drawing, comprises a pair of transistors 29 and 31 connected as a differential amplifier in a common-emitter mode. The collector electrode of the transistors 29 and 31 are connected to the bridge output terminals 17 and 15 respectively, their emitter electrodes are connected at a common junction 30 through resistors 33 and 35, respectively. An energy source represented by a battery 28 has its positive terminal connected to the bridge input terminal 13 and its negative terminal connected to the common junction 30 through a large value resistor 37. The resistors 39 and 43 are connected in series between the terminals of the battery 28, the resistor 39 being connected to the positive terminal and the resistor 43 to the negative terminal. In the same manner, the resistors 41 and 45 are connected in series across the terminals of the battery 28 with the resistor 41 connected to the positive terminal and the resistor 45 connected to the negative terminal. The resistors 39 and 41 each have voltage pickoffs or sliders 40 and 42, respectively, which are connected to the base electrodes of the transistors 29 and 31, respectively. The sliders 40 and 42 permit the bias voltage applied to the base electrodes of the transistors 29 and 31 to be adjusted. A temperature sensitive diode 47 is connected in forward biased relationship across the resistor 41 and is physically positioned in close proximity to the impedance bridge 1 to be subject to the same ambient temperature variations as those influencing the bridge 1.

In operation, the impedance bridge 1 is energized by the first constant current source means provided by the transistor 19 as was previously explained. It is here noted that while a constant current source means is used in the preferred embodiment of the invention, other current source means, not necessarily constant, could also be used for applying a controlled input signal across the input terminals 11 and 13 of the bridge 1. Since the impedance elements which comprise the arms of the bridge 1 are inherently temperature sensitive, ambient temperature variations cause the null point of the bridge 1 to shift. Thus, the impedance bridge 1 is undesirably unbalanced and an unwanted voltage signal will appear upon the output terminals 15 and 17. This voltage signal has a magnitude which is a function of the difference between the instant ambient temperature and the ambient temperature at which the bridge was balanced.

The temperature compensation circuit of the present invention neutralizes the impedance bridge 1 for these adverse effects of ambient temperature variations by injecting compensating currents into adjacent arms of the bridge 1. The compensating currents are developed by supplying a second constant current signal to the bridge input terminal 13 and by proportionally controlling the division of this second constant current between parallel first and second current paths including the adjacent arms, respectively of the bridge. The first current path comprises the impedance element 5 of the bridge, the collector-emitter path of the transistor 31 and the resistor 35. Similarly, the second current path comprises the impedance element 9 of the bridge, the collector-emitter path of the transistor 29, and the resistor 33. The proportionate division of this second constant current into compensating currents is controlled as a function of the ambient temperature variations by utilizing the linear negative impedance-temperature characteristic of the forward biased diode 47 to control the impedance of the collector-emitter path of the transistor 31. The diode 47 accomplishes its control by determining the bias voltage applied to the base electrode of the transistor 31 as a function of the ambient temperature.

As mentioned above, the compensating currents which flow in the first and second current paths are provided by proportionally dividing a second constant current signal supplied to the bridge input terminal 13. This second current supplied to the input terminal 13 is maintained substantially constant by making the impedance value of the resistor 37 large in magnitude with respect to the variations in impedance of the parallel first and second current paths between the input terminal 13 and the common junction 30. The resistor 37 and the battery 28, therefore, serve effectively as a simple constant current source signal means to provide the second substantially constant current signal to the bridge input terminal 13. Should use of a more elaborate constant current source means be found desirable, one similar to the first constant current source means used to excite the bridge 1 could be here employed.

The diode 47, by means of the resistor 41 and the slider 42, impresses the bias voltage on the base electrode of the transistor 31. The slider 42 allows the proportion of the total voltage drop across the diode 47 to be determined by adjustment, and thereby allows the response sensitivity of the differential amplifier to temperature variations to be varied. This bias voltage varies linearly with ambient temperature variations since the impedance of the diode 47 varies in accordance with its linear negative impedance temperature characteristic. The varying bias voltage, thus, causes the impedance of the collector-emitter path of the transistor 31 to vary in linear proportion to the temperature variations influencing the bridge 1 and thereby causes the compensation currents to proportionally divide between the impedance elements 5 and 9 to compensate the bridge 1. It was assumed in the above discussion that the sliders 40 and 42 had initially been properly adjusted to compensate for the specific temperature characteristics of the bridge 1 used. It should be noted that a diode having linear impedance-temperature characteristics can only be used directly to compensate a bridge which unbalances as a result of temperature in a linear manner. Should the bridge have an other than linear temperature characteristic, a means responsive to temperature having an appropriate characteristic of response should be used. It should further be understood that while a diode is used in the apparatus constructed in accordance with the present invention, other means responsive to temperature variations, such as a thermistor, could be employed.

Let us now consider the manner for properly adjusting the sliders 40 and 42. Assuming an initial unbalance condition of the bridge 1, the slider 42 is adjusted first to maintain the bridge 1 in its instant state of unbalance. Adjustment of the slider 42 determines the scale factor of correction, i.e. the amount of compensation applied to the bridge 1 by the differential amplifier. In other words, positioning of the slider 42 determines the percent of the voltage drop across the diode 47 applied to the base electrode of the transistor 31. This adjustment, therefore, determines the amount to which the impedance of the collector-emitter path will vary due to temperature variations. Thus, once the slider 42 is correctly adjusted, the impedance of the collector emitter path will vary in response to temperature variations to the extent necessary to cause the differential amplifier to maintain the bridge 1 in its instant state of unbalance. Once the scale factor is set, the slider 40 is then adjusted to balance the bridge 1. The bridge 1 is now properly adjusted and will be maintained in balance by the compensating action of the differential amplifier.

Since each bridge compensated has different characteristics, i.e. rate and polarity of unbalance with temperature variations, it should be noted that the circuit of the present invention is directional. For example, in the illustrated circuit, an increase in the ambient temperature will cause the impedance of the diode 47 to decrease, thereby decreasing the voltage across the resistance 41 and the part of the voltage applied to the base electrode means of the transistor 31. Thus, the potential difference between the collector and the base of the transistor 31 will decrease correspondingly causing an increase in the conductivity of the transistor 31. Therefore more current will flow in the transistor 31 and the correspondingly less in the transistor 29. As a result, the net current in the bridge impedance element 5 will decrease and the net current in the bridge impedance element 9 will increase. It should be noted that the total currents flowing through the impedance elements 5 and 9 are each composed of two opposed components, the first and larger component being supplied by the first constant current source means and the second component being that supplied by the second constant current source means in the form of compensation currents. Thus, with ambient temperature increases, the bridge 1 unbalance would tend to be neutralized, providing its original unbalance was of the polarity that the potential upon output terminal 15 was greater than the potential upon the output terminal 17. If the unbalance voltage were of opposite polarity, i.e. sense, it would be necessary to reverse the connections of the differential amplifier across the output terminals of the bridge 1.

Thus, there has been provided a temperature compensation circuit for neutralizing the adverse effects of ambient temperature variations upon the null point of an impedance bridge characterized by use of means responsive to ambient temperature variations to control currents injected into adjacent bridge arms to compensate the impedance bridge for adverse temperature effects.

The embodiments of the invention in which an exclusive property or privilege is claimed are defined as follows:

1. In an impedance bridge circuit having bridge arms comprised of impedance elements which are adversely affected by ambient temperature variations so as to adversely affect the balance of said bridge, said bridge having a first and a second input terminal, a first and a second output terminal, and means for applying a controlled input signal across said input terminals; a temperature compensation circuit for neutralizing the adverse effect of said temperature variations on the balance of said bridge, said compensating circuit comprising:
    a constant current signal source means;
    a first and a second current path;
    means for dividing said constant current signal between said first and second current paths;

means connecting said first current path in series with that arm of said bridge connected between said first output terminal and said second input terminal;

means connecting said second current path in series with that arm of said bridge connected between said second output terminal and said second input terminal; and control means responsive to said temperature variations for controlling the proportional division of said constant current signal between said first and second current paths in accordance with said temperature variations whereby to compensate said bridge for said adverse temperature effects.

2. The apparatus defined in claim 1 wherein said control means responsive to said temperature variations comprises a temperature sensitive impedance element.

3. The apparatus defined in claim 2 wherein said temperature sensitive impedance element is a diode.

4. The apparatus defined in claim 1 wherein said first and second current paths and said means for dividing said constant current signal between said first and second current paths comprise a differential amplifier.

5. The apparatus defined in claim 4 wherein said differential amplifier is a transistor differential amplifier.

6. The apparatus defined in claim 5 wherein said control means responsive to said temperature variations comprises a temperature sensitive impedance element.

7. The apparatus defined in claim 1 including means for varying the response sensitivity of said control means to said temperature variations.

References Cited

UNITED STATES PATENTS 3,360,715   12/1967   Mueller.
3,370,224   2/1968   Merrell et al.
3,406,331   10/1968   Rose.

LEE T. HIX, Primary Examiner

G. GOLDBERG, Assistant Examiner

U.S. Cl. X.R.
323—75; 324—105, 98